(12) United States Patent
Gordon et al.

(10) Patent No.: US 6,686,851 B1
(45) Date of Patent: Feb. 3, 2004

(54) ALTITUDE TAPE AND INTEGRAL VERTICAL SPEED INDICATOR

(75) Inventors: Thomas M. Gordon, Ely, IA (US); Timothy J. Etherington, North Liberty, IA (US)

(73) Assignee: Rockwell Collins, Cedar Rapids, IA (US)

( * ) Notice: Subject to any disclaimer, the term of this patent is extended or adjusted under 35 U.S.C. 154(b) by 582 days.

(21) Appl. No.: 09/648,829

(22) Filed: Aug. 25, 2000

(51) Int. Cl.[7] .............................................. G08B 23/00
(52) U.S. Cl. ........................ 340/970; 340/973; 340/977; 701/4
(58) Field of Search ................................ 340/970, 969, 340/967, 973, 977, 978; 701/4; 342/176

(56) References Cited

U.S. PATENT DOCUMENTS

| | | | | |
|---|---|---|---|---|
| 5,136,301 A | * | 8/1992 | Bechtold et al. ............. 342/176 |
| 5,196,847 A | * | 3/1993 | Bateman ...................... 340/970 |
| 5,248,968 A | * | 9/1993 | Kelly et al. .................. 340/961 |
| 5,250,947 A | | 10/1993 | Worden et al. .............. 340/973 |
| 5,359,890 A | * | 11/1994 | Fulton et al. ............... 73/178 R |
| 5,412,382 A | * | 5/1995 | Leard et al. ................. 340/974 |
| 6,121,899 A | * | 9/2000 | Theriault .................... 340/967 |
| 6,173,220 B1 | * | 1/2001 | Schmitt ........................ 701/4 |
| 6,204,779 B1 | * | 3/2001 | Berlioz et al. ............... 340/970 |
| 6,232,890 B1 | * | 5/2001 | Berlioz et al. ............... 340/970 |
| 6,400,283 B1 | * | 6/2002 | Berlioz et al. ............... 340/975 |

* cited by examiner

*Primary Examiner*—Nina Tong
(74) *Attorney, Agent, or Firm*—Nathan O. Jensen; Kyle Eppele

(57) ABSTRACT

A device for enhancing altitude awareness in an avionics display is disclosed. The device includes an altitude indicator that displays a current altitude on the avionics display. A scrolling display of altitude levels is displayed with the altitude indicator on the avionics display. The scrolling display includes a plurality of scaled numbers that represent predetermined intervals of altitude levels surrounding the current altitude. The scrolling display also includes a non-numeric graphic construct that is displayed adjacent the plurality of scaled numbers. The graphic construct has first and second substantially mirror-image portions that are positioned on first and second opposing sides of the plurality of scaled numbers. A controller causes the altitude indicator to display the current altitude on the avionics display. The controller also causes the scrolling display to display the predetermined intervals of altitude levels surrounding the current altitude and to vary the graphic construct consistent with the predetermined altitude levels that are displayed. A vertical speed indicator may be superimposed upon the scrolling display.

19 Claims, 4 Drawing Sheets ns display.

ALTITUDE TAPE AND INTEGRAL VERTICAL SPEED INDICATOR

FIELD OF THE INVENTION

The present invention relates to avionics, and more particularly, to altitude indicators on an avionics display.

BACKGROUND OF THE INVENTION

The cockpit of an airplane has traditionally included a vast array of analog switches and rotary dials to monitor and control the dozens of functions and inputs necessary to safely fly an aircraft. It has long been a goal to simplify avionics controls so that important information is readily available to a pilot. Computer-controlled avionics display systems have enjoyed widespread acceptance because of their ability to display a large number of parameters in just a few programmable displays, with menus and control bars enabling multiple display formats to be selectively displayed thereon as needed. Information that was once displayed on the rotary dials is now converted to digital form.

Although computer controlled displays have many advantages, one drawback is that a digital numeric readout of a parameter may not give as much information to a pilot as an analog rotary dial. Indeed, an advantage of rotary dials is that the position and the relative movement of the dial may deliver information over and above the explicit parameter displayed by the dial. For example, the explicit parameter displayed by a rotary-dial altimeter is the altitude of an aircraft. However, the speed of the movement of the dial gives the pilot a feel for the rate of climb or descent. Furthermore, many altimeters are designed so that the dial is at a 12 o'clock position (straight up) when the aircraft is at an altitude that is an integer multiple of 1000 feet (i.e., 1000, 2000, 3000, etc.) and at a 6 o'clock position (straight down) when the aircraft is at an altitude that is an odd integer multiple of 500 feet (i.e., 500, 1500, 2500, etc.). These altitudes are known as cardinal altitudes and are frequently used in flight plans. A pilot can merely glance at the position of the dial to know the aircraft's vertical position in relation to nearby cardinal altitudes. This supplemental altitude information (rate of climb or descent, relative altitude awareness) may not be as easy to ascertain when reading a purely numeric altitude reading. Furthermore, because so many parameters must be displayed on just a few computer-controlled displays, display space is at a premium. There simply may not be enough room to display the supplemental altitude information.

It is therefore an object of the invention to increase a pilot's altitude awareness when using a computer-controlled avionics display system.

It is another object of the invention to display altitude information in a compact yet readable format.

A feature of the invention is the combination of numeric and graphic display components to enhance altitude awareness of a pilot.

An advantage of the invention is that the supplemental altitude information may be displayed with the altitude of the aircraft.

SUMMARY OF THE INVENTION

The invention provides a device for enhancing altitude awareness in an avionics display. The device includes an altitude indicator that displays a current altitude on the avionics display. A scrolling display of altitude levels is displayed with the altitude indicator on the avionics display. The scrolling display includes a plurality of scaled numbers that represent predetermined intervals of altitude levels surrounding the current altitude. The scrolling display also includes a non-numeric graphic construct that is displayed adjacent the plurality of scaled numbers. The graphic construct has first and second substantially mirror-image portions that are positioned on first and second opposing sides of the plurality of scaled numbers. A controller causes the altitude indicator to display the current altitude on the avionics display. The controller also causes the scrolling display to display the predetermined intervals of altitude levels surrounding the current altitude and to vary the graphic construct consistent with the predetermined altitude levels that are displayed.

The invention also provides a device for enhancing altitude awareness in an avionics display. The device includes an altitude indicator that displays a current altitude on the avionics display. A scrolling, scaled altitude tape is displayed with the altitude indicator on the avionics display. The altitude tape includes a plurality of scaled numbers that represent predetermined intervals of altitude levels adjacent the current altitude. A vertical speed indicator is superimposed on the altitude tape. The vertical speed indicator is configured to display vertical speed. A controller causes the altitude indicator to display the current altitude on the avionics display and further causes the scrolling display to display the predetermined levels of altitude levels. The controller also causes the vertical speed indicator to display vertical speed.

The invention further provides a method of enhancing altitude awareness in an avionics display. According to the method, a current altitude is indicated on the avionics display. Near the displayed current altitude, a scrolling display of scaled numbers is displayed. The numbers represent predetermined intervals of altitude levels that are adjacent the current altitude. A substantially continuous non-numeric graphic construct is displayed beside the scrolling display of scaled numbers. The graphic construct is varied to highlight the predetermined intervals of altitude levels.

DETAILED DESCRIPTION OF THE DRAWINGS

Figure 1:
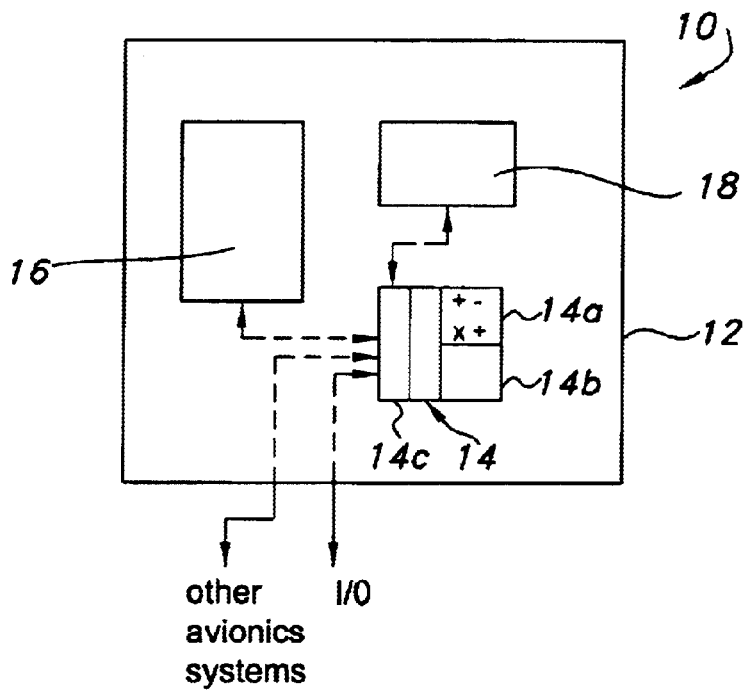
FIG. 1 is a block diagram of an avionics display system.

An avionics display system 10 is shown in block diagram form in FIG. 1. Avionics display systems are used to control other avionics systems and to display information received from other avionics systems. These other avionics systems (not shown) may include flight control systems, air data computers, engine indication systems, altimeters, traffic collision and avoidance systems, and other types of systems currently installed or planned for future aircraft applications. Avionics display system 10 is preferably a primary flight display, which displays critical flight information such as airspeed, altitude, attitude, and bearing to a pilot. Avionics display systems typically include a line-replaceable unit (LRU) 12 that may be mounted on the instrument panel of an aircraft. LRU 12 includes a controller 14, which may be a known type of flight computer. Controller 14 typically has a processor 14a, a memory 14b, and an interface 14c for communicating with other components in the LRU and the avionics display system. LRU 12 also includes a display 16 that may be based on technologies such as cathode-ray tubes, liquid-crystal displays, organic light-emitting diodes, or other technologies. LRU 12 may also include a keyboard 18 to input information into processor 14.

Figure 2:
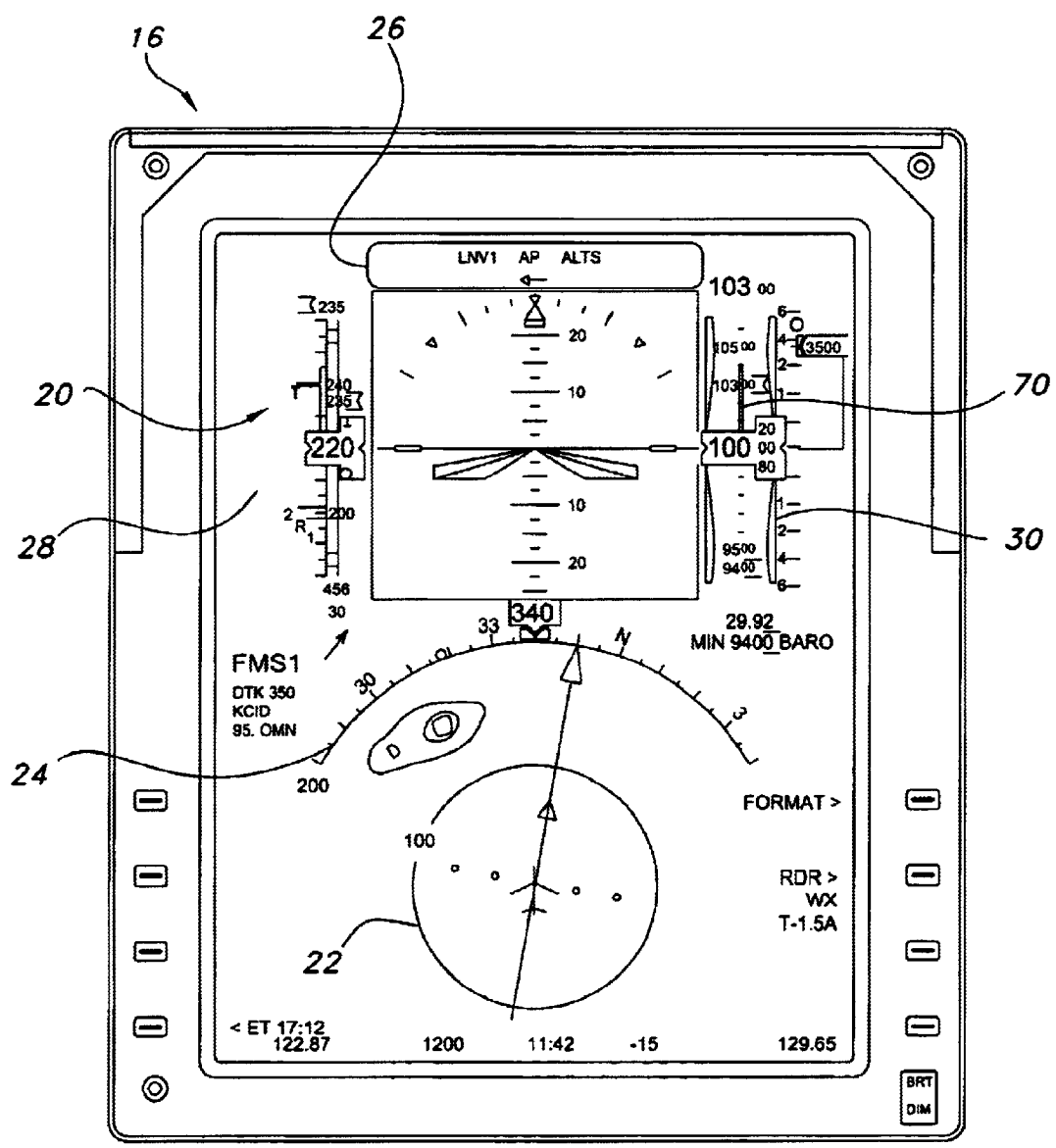
FIG. 2 is a view of a display format according to the invention.

FIG. 2 shows a display format 20 of display 16 according to the invention. As avionics display system 10 is a primary flight display, display format 20 includes a horizontal situation indicator (HSI) 22 coupled with a heading indicator 24. Directly above HSI 22 is an attitude director indicator (ADI) 26. To the left of ADI 26 is an airspeed indicator 28, and to the right of ADI 26 is an altitude display area 30 in which altitude is displayed. The relative positions of HSI 22, heading indicator 24, ADI 26, airspeed indicator 28 and altitude display area 30 are determined according to accepted avionics display formats.

Figures 3, 7:
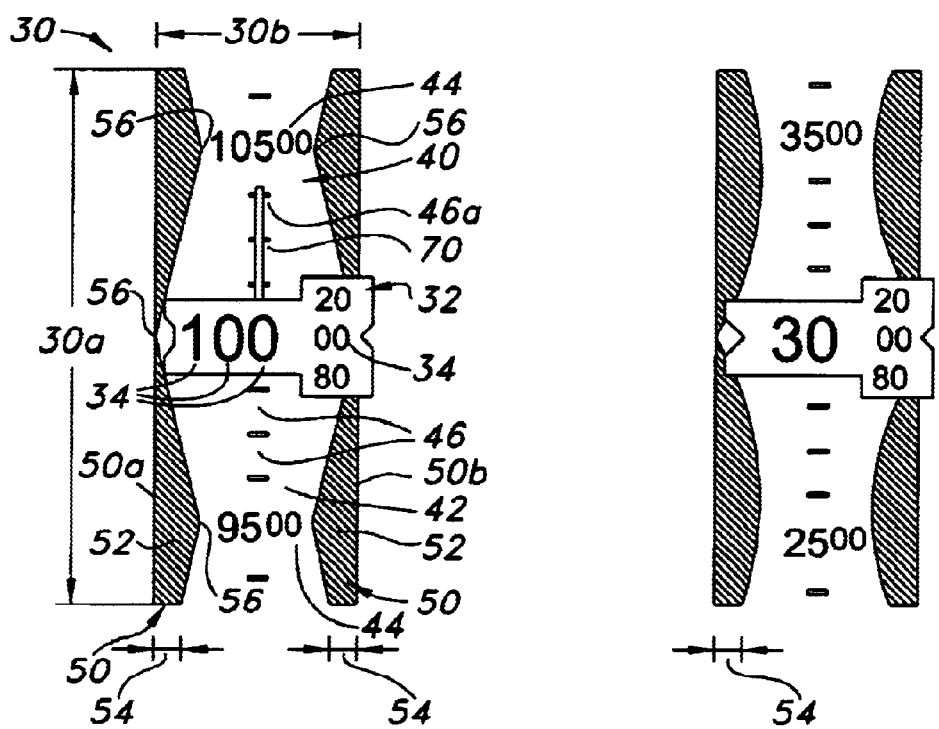
FIG. 3 is a detail view of an altitude display area according to an embodiment of the invention.
FIG. 7 is a detail view of an altitude display area according to yet another embodiment of the invention.

FIG. 3 shows altitude display area 30 according to the invention. Altitude display area 30 has a length 30a and a width 30b. An altitude indicator 32 is located substantially midway along length 30a of the altitude display area. Altitude indicator 32 is stationary, that is, the altitude indicator does not move within altitude display area 30 as the altitude changes. As shown in FIGS. 2 and 3, altitude indicator 32 includes a plurality of changeable digits 34 that combine to numerically display the current altitude of the aircraft.

A scrolling display 40 is also positioned within display area 30. Scrolling display 40 enhances the pilot's awareness of altitude by providing numeric and non-numeric representations of altitude levels that are adjacent the aircraft's current altitude. Scrolling display 40 may be considered to be an altitude tape that appears to scroll in and out of altitude display area 30 as the aircraft's altitude varies. As shown in detail in FIG. 3, scrolling display 40 includes a numeric scale 42. Numeric scale 42 comprises a plurality of numbers 44 representing predetermined and regular intervals of altitude levels that are adjacent the current altitude of the aircraft. For the sake of clarity, hash or tic marks 46 are positioned evenly between numbers 44 to subdivide the altitude intervals. It is preferable for numbers 44 to represent intervals of 500 feet, which may be considered cardinal-altitude levels. Tic marks 46 indicate intervals of 100 feet. However, other intervals or units of measurement may also be chosen.

Scrolling display 40 also includes a graphic construct 50 that provides a non-numeric representation of adjacent altitude levels. FIG. 3 shows graphic construct 50 to include first and second substantially mirror-image portions 50a, 50b that are positioned on opposing sides of numeric scale 42. Each portion 50a, 50b comprises a shaded or colored area 52 that runs along length 30a of display area 30 and borders either side of numbers 44. Each portion 50a, 50b has a dimension 54 as measured parallel to width 30b of altitude display area. Dimension 54 varies according to the adjacent altitude level displayed on numeric scale 42. The variation of dimension 54 creates a recurring geometric pattern that highlights certain altitude levels, which are preferably the cardinal altitude levels. For example, dimension 54 is at a maximum size adjacent the altitude level of 9500 feet. Dimension 54 linearly decreases until adjacent the altitude level of 10000 feet, at which point the dimension is at a minimum size. From there, dimension 54 linearly increases until adjacent an altitude level of 10500 feet. Graphic construct 50 then repeats this pattern. As graphic construct 50 is positioned upon either side of numbers 44, the recurring linear variation in dimension 54 creates an hourglass-shaped or figure 8, where the angles 56 of the hourglass or figure-8 are positioned at the point in numeric scale 42 adjacent the cardinal altitude levels.

Figure 4:
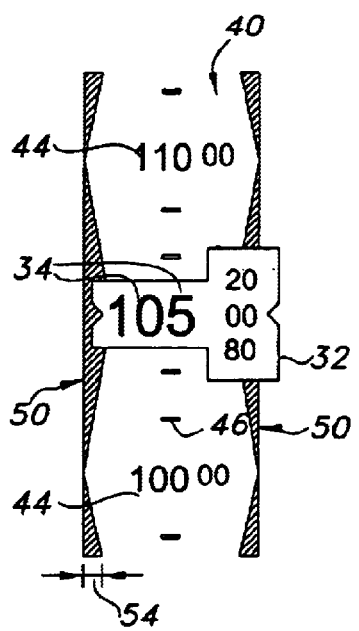
FIG. 4 is a detail view of the altitude display area of FIG. 3 at another altitude level.

FIGS. 3 and 4 show how altitude indicator and scrolling display 40 combine to provide enhanced altitude awareness. Altitude indicator 32 is overlaid upon scrolling display 40 so that the altitude indicator is always clearly shown. In FIG. 3 the altitude of 10000 feet is not shown on scrolling display 40 because that altitude level is shown on the altitude indicator. During a rise from 10000 feet to 10500 feet, changeable digits 34 of altitude indicator 32 display an incrementally increasing number that represents the current altitude of the aircraft, while scrolling display 40 appears to move or slide downward. The scrolling display does this so that it continually displays altitude levels that are adjacent the current altitude level. When the altitude of 10500 feet is reached and displayed on altitude indicator (FIG. 4), scrolling display 40 includes numbers 44 representing altitudes of 10000 and 11000 feet, which are the cardinal altitude levels adjacent the current altitude of 10500. Hash marks 46 represent 100 foot increments of adjacent altitude levels. Graphic construct 50 has also changed appearance in that minimum sizes of dimension 54 are shown adjacent altitude levels of 10000 and 11000 feet, and maximum sizes of dimension 54 are shown adjacent the altitude of 10500 feet, which is displayed on altitude indicator 32. The altitude indicator and the scrolling display are similarly varied when the altitude decreases.

Figure 6:
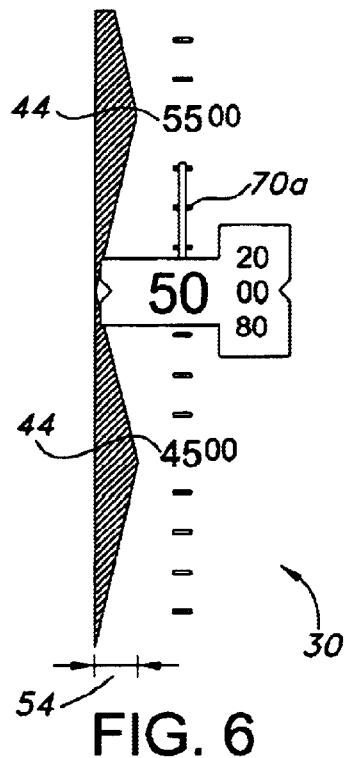
FIG. 6 is a detail view of an altitude display area according to still another embodiment of the invention.
Figure 5:
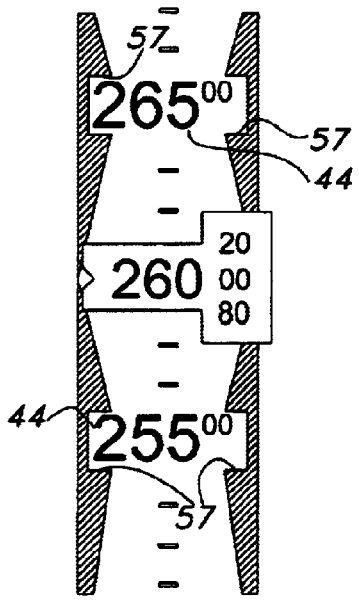
FIG. 5 is a detail view of an altitude display area according to yet another embodiment of the invention.

It may be necessary to modify graphical construct 50 so that numbers 44 are clearly indicated. As shown in FIG. 5, a segment 57 of the graphical construct may be cut out or removed so that all of numbers 44 may be displayed in the same color with the same background color. It may also be desirable for graphical construct 50 to be displayed on only one side of numbers 44. FIG. 6 shows how altitude display area 30 would look in such an instance. Although the hourglass or figure 8 effect is not as pronounced, the maximum and minimum sizes of dimension 54 still enhance the identifying and reading of numbers 44.

Figure 8:
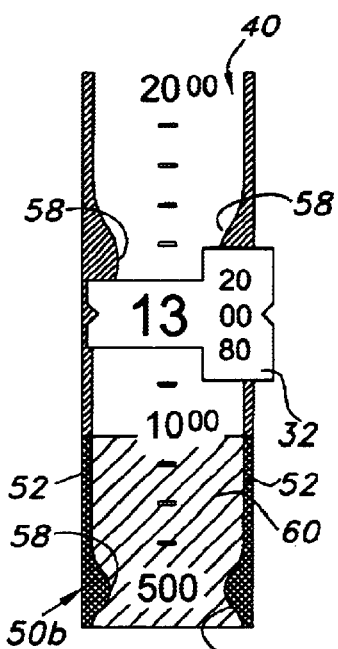
FIG. 8 is a detail view of an altitude display area according to yet another embodiment of the invention.

Other features and variations of the invention are shown in FIGS. 7–10. For example, FIG. 7 depicts a graphic construct 50a having a gradually curved increase and decrease in dimension 54. FIG. 8 shows another embodiment in which a combination of straight and curved shapes are included in graphic construct 50. Rounded "bumps" 58 are positioned adjacent 500 and 1500-foot altitude levels, while 1000 and 2000 foot altitude levels are positioned midway between the bumps. Note that scrolling display 40 does not show a number at the 1500 feet altitude level. This is because 1500 feet is so close to the current altitude of 1300 feet, as displayed on altitude indicator 32, that the altitude indicator would be partially overlaid on a numeric indicator at the 1500 foot altitude level. To avoid confusion, then, no number is shown at the 1500 foot level. However, bumps 58 indicate the 1500 foot level, notwithstanding the bumps being partially hidden by altitude indicator 32. This is another way in which the graphic construct enhances a pilot's awareness of adjacent altitude levels.

Scrolling display 40 may include shaded areas to indicate predetermined altitude ceilings or floors. For example, a low altitude warning may be provided to warn a pilot that the aircraft is flying close to the ground. This is shown in FIG. 8 as a shaded area 60 below the 1000 foot altitude level within numeric scale 42. Shaded area 52 of graphic construct 50 may also have a different color or intensity of shading below the 1000 foot level. This feature alerts the pilot to unsafe or unintended flight patterns, and heightens the pilot's awareness of low altitudes.

Figure 9:
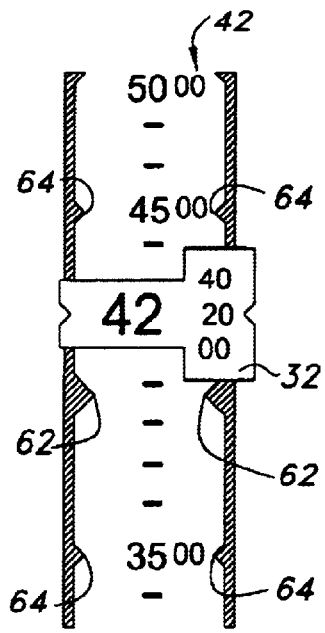
FIG. 9 is a detail view of an altitude display area according to still another embodiment of the invention.

FIG. 9 depicts another embodiment of the invention in which graphic construct 50 includes large protuberances 62 adjacent numbers 44 that are integer multiples of 1000 feet. Small protuberances 64 are positioned midway between adjacent large protuberances 62 to indicate the 500-foot altitude levels therebetween. Note that numeric scale 42 does not include a number at 4000 feet because, as in FIG. 8, displaying that altitude level would conflict with altitude indicator 32.

Figure 10:
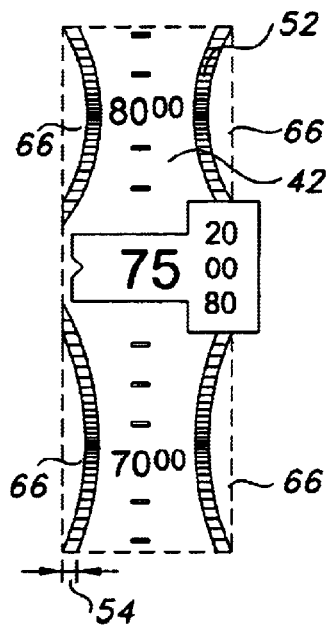
FIG. 10 is a detail view of an altitude display area according to still another embodiment of the invention.

The color or shade of shaded area 52 may vary with altitude level. As shown in FIG. 10, shaded area 52 is darkest adjacent altitude levels of 7000 and 8000 feet, and gradually becomes lighter as the altitude level approaches 7500 feet. As with previous embodiments, this pattern repeats every 1000 feet. FIG. 10 also shows a variation in shape of graphic construct 50 in which portions 66 of the graphic construct are not shaded or are differently shaded from the remainder of the graphic construct. This further accentuates altitude levels shown in numeric scale 42. FIG. 10 shows a further variation in that dimension 54 reaches a maximum size adjacent altitude intervals that are multiples of 1000 feet in numeric scale 42. Dimension 54 reaches a minimum size adjacent the 500 foot altitude intervals intermediate the multiples of 1000 feet in the numeric scale. This is differs from previous embodiments, where dimension 54 reached a minimum size adjacent altitude intervals that are multiples of 1000 feet.

Another feature of the invention is a vertical speed indicator included within altitude display area 30. FIGS. 2 and 3 depict a vertical speed indicator 70 as a variable-height bar that is superimposed and centered in scrolling display 40 and having its base at the current altitude level. A similar vertical speed indicator 70a is depicted in FIG. 6. Vertical speed indicator 70 uses numeric scale 42 to represent the vertical speed of the aircraft. For instance, vertical speed indicator 70 in FIGS. 2 and 3 is the height of hash mark 46a that indicates a 400-foot positive altitude change. This is interpreted to mean that the aircraft is ascending at 400 feet per minute. As the vertical speed of the plane changes, so too does the height of vertical speed indicator 70. Because vertical speed indicator 70 displays the vertical speed of the aircraft in feet per minute on the same scale that altitude levels are displayed, the vertical speed indicator is also a trend indicator because it indicates what the altitude of the aircraft will be in one minute, assuming a constant rate of climb. For example, vertical speed indicator 70 in FIG. 3 shows that in one minute, the aircraft will climb to 10400 feet. This can be easily ascertained by a pilot by merely glancing at altitude display area 30. Vertical speed indicator 70 therefore further enhances the altitude awareness of the pilot.

Figure 11:
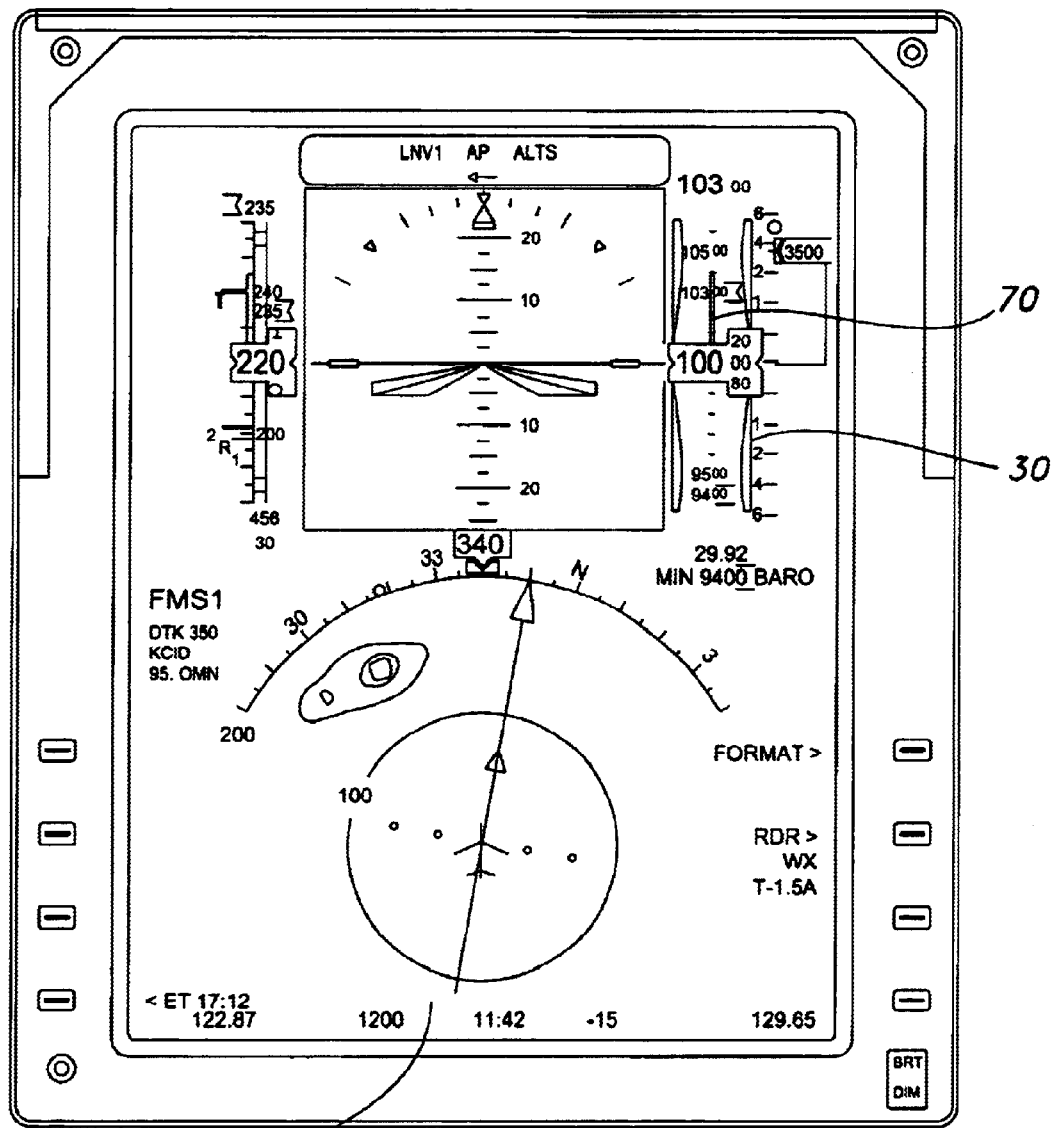
FIG. 11 is a view of a display area according to another embodiment of the invention.

As depicted in the various figures described above, the invention may be varied in many ways to enhance altitude awareness. The features of the invention may be combined in different ways in keeping within the scope of the invention. For example, FIG. 11 depicts a display format 20a that does not use a graphical construct inside altitude display area 30. Other combinations are also possible.

An advantage of the invention is that altitude awareness is increased. An inherent sense of changing and relative altitude is provided when the aircraft is ascending or descending, and an inherent sense of current altitude is provided when the aircraft is at level flight.

Another advantage is that the invention uses graphical means to replace the traditional rotary altimeter dial. The graphic construct permits cardinal elevation levels to be readily ascertainable.

Still another advantage is that the vertical speed indicator, when superimposed on the numeric scale of the scrolling display, permits a pilot to easily ascertain the altitude trend of the aircraft. This also reduces required display area.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A device for enhancing altitude awareness in an avionics display, comprising:

an altitude indicator that displays a current altitude on the avionics display;

a scrolling display of altitude levels that is displayed with the altitude indicator on the avionics display, wherein the scrolling display includes a plurality of scaled numbers that represent predetermined intervals of altitude levels surrounding the current altitude, and a non-numeric graphic construct, displayed adjacent the plurality of scaled numbers, wherein the graphic construct has first and second substantially mirror-image portions that are positioned on first and second opposing sides of the plurality of scaled numbers; and a controller that causes the altitude indicator to display the current altitude on the avionics display and further causes the scrolling display to display the predetermined intervals of altitude levels surrounding the current altitude and to vary the graphic construct consistent with the predetermined altitude levels that are displayed.

2. The device of claim 1, wherein each portion of the graphic construct has a dimension, and wherein the size of the dimension is at a maximum adjacent at least part of the predetermined altitude levels.

3. The device of claim 2, wherein the dimension is a width of each portion of the graphic construct.

4. The device of claim 2, wherein the altitude indicator and the scrolling display are positioned within an altitude display area, and wherein the dimension is a distance from an edge of the altitude display area.

5. The device of claim 2, wherein the dimension is perpendicular to the direction in which the plurality of scaled numbers are scrolled.

6. The device of claim 1, wherein each portion of the graphic construct has a dimension, and wherein the size of the dimension is at a minimum adjacent at least part of the predetermined altitude levels.

7. The device of claim 1, wherein the graphic construct has a brightness that varies according to the predetermined altitude levels displayed adjacent thereto.

8. The device of claim 1, wherein the graphic construct has a color that is varied according to the predetermined altitude levels displayed adjacent thereto.

9. The device of claim 1, wherein the altitude indicator is overlaid upon the graphic construct and hides a part of the graphic construct from view.

10. The device of claim 1, wherein at least one of the scaled numbers and the graphic construct are removed from view if adjacent but not overlaid by the altitude indicator.

11. The device of claim 1, wherein a segment of the graphic construct is removed from view if the segment of the graphic construct is adjacent to one of the plurality of scaled numbers.

12. The device of claim 1, further including a vertical speed indicator that is positioned upon the scrolling display of altitude levels and configured to display vertical speed.

13. The device of claim 1, further including an altitude trend indicator positioned upon the scrolling display of altitude levels and configured to indicate an altitude that will be attained in a predetermined time given a constant rate of altitude change.

14. A device for enhancing altitude awareness in an avionics display, comprising:

an altitude indicator that displays a current altitude on the avionics display;

a scrolling, scaled altitude tape that is displayed with the altitude indicator on the avionics display, wherein the altitude tape includes a plurality of scaled numbers that represent predetermined intervals of altitude levels adjacent the current altitude;

a vertical speed indicator that is superimposed on the altitude tape, the vertical speed indicator being configured to display vertical speed; and a controller that causes the altitude indicator to display the current altitude on the avionics display and further causes the scrolling display to display the predetermined levels of altitude levels, wherein the controller further causes the vertical speed indicator to display vertical speed.

15. The device of claim 14, wherein the vertical speed indicator is an altitude trend indicator that is configured to indicate an altitude that will be attained in a predetermined time given a constant rate of altitude change.

16. The device of claim 14, wherein the scrolling, scaled altitude tape further includes a substantially continuous graphic pattern that is positioned along a side of the altitude tape, wherein the graphic pattern highlights the predetermined altitude levels.

17. A method of enhancing altitude awareness in an avionics display, comprising:

indicating a current altitude on the avionics display;

displaying near the current altitude a scrolling display of scaled numbers that represent predetermined intervals of altitude levels that are adjacent to the current altitude;

displaying a substantially continuous non-numeric graphic construct on either side of the scrolling display of scaled numbers; and varying the graphic construct to highlight the predetermined intervals of altitude levels.

18. The method of claim 17, further including:

displaying upon the scrolling display, in non-numeric form, an altitude that will be attained in a predetermined time given a constant rate of altitude change.

19. The method of claim 18, wherein the graphic construct has a size and wherein the graphic construct is varied by increasing and decreasing the size of the graphic construct.

* * * * *